United States Patent
Zaiser

(10) Patent No.: US 8,720,162 B2
(45) Date of Patent: May 13, 2014

(54) MOTOR-DRIVEN MACHINE TOOL

(75) Inventor: Adolf Zaiser, Koengen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/863,197

(22) PCT Filed: Nov. 11, 2008

(86) PCT No.: PCT/EP2008/065277
§ 371 (c)(1),
(2), (4) Date: Jul. 16, 2010

(87) PCT Pub. No.: WO2009/089940
PCT Pub. Date: Jul. 23, 2009

(65) Prior Publication Data
US 2011/0048753 A1   Mar. 3, 2011

(30) Foreign Application Priority Data

Jan. 16, 2008   (DE) .......................... 10 2008 004 638

(51) Int. Cl.
*F16H 25/08* (2006.01)
*F16H 33/10* (2006.01)

(52) U.S. Cl.
USPC ........... 53/49; 53/162.1; 74/25; 74/55; 74/61; 74/87

(58) Field of Classification Search
USPC ......... 173/49, 162.1, 213, 217; 74/25, 55, 60, 74/61, 87
See application file for complete search history.

(56) References Cited

U.S. PATENT DOCUMENTS

| 4,729,194 | A | | 3/1988 | Maier et al. |
|---|---|---|---|---|
| 5,888,128 | A | * | 3/1999 | Lamprecht et al. ........... 451/357 |
| 6,206,771 | B1 | * | 3/2001 | Lehman ....................... 451/357 |
| 6,907,943 | B2 | * | 6/2005 | Ikuta ............................. 173/117 |
| 6,926,595 | B2 | | 8/2005 | Pollak et al. |
| 6,974,362 | B2 | * | 12/2005 | Lindell et al. ...................... 451/5 |
| 7,022,002 | B2 | * | 4/2006 | Lampka et al. ............... 451/344 |
| 7,108,077 | B2 | * | 9/2006 | Zaiser ............................ 173/48 |
| 7,204,320 | B2 | * | 4/2007 | Berg ................................ 173/2 |
| 7,246,533 | B2 | * | 7/2007 | Lagaly et al. ...................... 74/44 |
| 7,708,084 | B2 | * | 5/2010 | Duesselberg et al. ........... 173/48 |
| 2003/0220058 | A1 | | 11/2003 | Pollak et al. |
| 2004/0117993 | A1 | | 6/2004 | Armstrong |
| 2005/0197052 | A1 | | 9/2005 | Lampka et al. |
| 2005/0247468 | A1 | * | 11/2005 | Lamprecht ..................... 173/213 |
| 2008/0314609 | A1 | * | 12/2008 | Rondahl ...................... 173/162.1 |
| 2009/0311952 | A1 | * | 12/2009 | Zaiser ........................... 451/357 |

FOREIGN PATENT DOCUMENTS

| DE | 101 04 993 A1 | 8/2002 |
|---|---|---|
| EP | 0203255 A2 | 12/1986 |
| EP | 0372376 A2 | 6/1990 |
| EP | 1407847 A2 | 4/2004 |
| RU | 2070851 C1 | 12/1996 |
| RU | 2152862 C2 | 7/2000 |

* cited by examiner

*Primary Examiner* — Thanh Truong
*Assistant Examiner* — Eyamindae Jallow
(74) *Attorney, Agent, or Firm* — Maginot, Moore & Beck

(57) ABSTRACT

A motor-driven machine tool comprises a tool driven in a rotating fashion, a drive shaft driven by a drive unit and an output shaft for holding the tool. According to the invention, the rotating motion of the drive shaft can be transferred to the output shaft by way of an eccentric coupling device. A mass balancing device is provided for smoothing out vibrations, which has a stroking mass part moveably mounted in a carriage guide and impinged by an eccentric member driven by one of the shafts. The stroking mass part executes a rotary smoothing motion.

19 Claims, 1 Drawing Sheet

MOTOR-DRIVEN MACHINE TOOL

CROSS-REFERENCE TO RELATED APPLICATION

This application is a 35 USC 371 application of PCT/EP2008/065277 filed on Nov. 11, 2008.

BACKGROUND OF THE INVENTION

1. Field of the Invention

The invention relates to a motor-driven power tool, in particular a hand-held power tool.

2. Description of the Prior Art

DE 101 04 993 A1 has disclosed a hand-held power tool for grinding or polishing, which has a drive motor, a transmission coupled to the drive motor, and a grinding wheel operatively connected to the transmission. The hand-held power tool can be used for superfinishing in which the rotary motion of the drive shaft is converted into an eccentric rotary motion of the grinding wheel with the aid of an eccentric drive. Since grinding appliances with an eccentric drives produce imbalance oscillations that result in decreased comfort and increased material stresses, care must be taken that oscillations of this kind do not exceed a permissible intensity.

OBJECT AND ADVANTAGES OF THE INVENTION

The object of the invention is to embody a low-oscillation motor-driven power tool in which the rotary motion of the drive shaft can be transmitted via an eccentric coupling device to the output shaft, which supports the tool, by means of simple structural measures.

The motor-driven power tool according to the invention is preferably a hand-held power tool. The rotary motion of the drive shaft, which is acted on by the drive motor, is transmitted by means of an eccentric coupling device to the output shaft that supports the tool. The eccentric coupling device produces a rotary pendulum motion of the output shaft.

In order to compensate for imbalance oscillations that are produced due to the eccentric drive motion, a mass-compensation device is provided, which is operatively connected to at least one of the shafts, i.e. either the drive shaft or the output shaft or both shafts, and executes a compensating motion in opposition to the eccentric coupling motion. This oscillation compensation results in the fact that the oscillation or vibration load in the power tool is considerably reduced in individual operating phases—advantageously at least in the idle mode of the power tool and possibly also during the working operation. To reduce oscillations, the mass-compensation device executes a compensating motion in opposition to the eccentric coupling motion, thus at least partially compensating for the rotary oscillations produced by the eccentric coupling device.

The mass-compensation device includes a stroke mass part, which is movably supported in a slot guide and is acted on by an eccentric element that is driven by one of the shafts. The stroke mass part executes a rotary compensating motion. This compensating motion is suitably situated in opposition to the eccentric drive motion, on the one hand with regard to the deflection direction and on the other hand with regard to the level of the mass compensation. In particular, the mass compensation occurs in that the bearing forces of the output shaft approach zero in idle mode. It is also possible, however, to select another operating point in which the imbalance oscillations are compensated for, e.g. an operating point during the regular operation of the power tool. It is also possible for the compensation oscillations, which are produced by means of the mass-compensation device to be amplified or attenuated in different ways, depending on the current operating mode, for example through a changed starting position of the stroke mass part.

The stroke mass part suitably executes the rotary compensating motion inside the slot guide. In this case, it is basically possible for the stroke mass part to execute an exclusively rotary motion or for it to execute a combination of rotary and translatory motion. In both cases, the mobility of the stroke mass part in the slot guide is enabled through correspondingly embodied bearings or by means of stroke curves or sliding block guides between the stroke mass part and the slot guide. In each case, the movement of the stroke mass part is produced by the eccentric element driven directly or indirectly by the drive shaft or the output shaft. The slot guide or sliding block guide in this case is suitably affixed to the housing; if need be, however, the slot guide could also be supported on a moving component of the power tool.

In order to achieve the rotary motion of the stroke mass part in the slot guide, preferably a roller bearing is provided by means of which the stroke mass part is supported in the slot guide. The stroke mass part is suitably supported in the middle of the slot guide, thus yielding a symmetrical support and suitably achieving a uniform deflection from the starting position in both directions. In addition, the eccentric element, particularly when embodied in the form of an eccentric cam, is advantageously situated in the middle of the slot guide, thus yielding a uniform impingement of force on the stroke mass part.

For example, the output shaft of the power tool is supported in cantilevered, eccentric fashion in the housing. In this type of support, the end surface of the output shaft remote from the tool is acted on by the eccentric coupling device.

BRIEF DESCRIPTION OF THE DRAWINGS

The invention will be described in detail below in conjunction with the accompanying drawings in which.

DESCRIPTION OF THE PREFERRED EMBODIMENT

Figure 1:
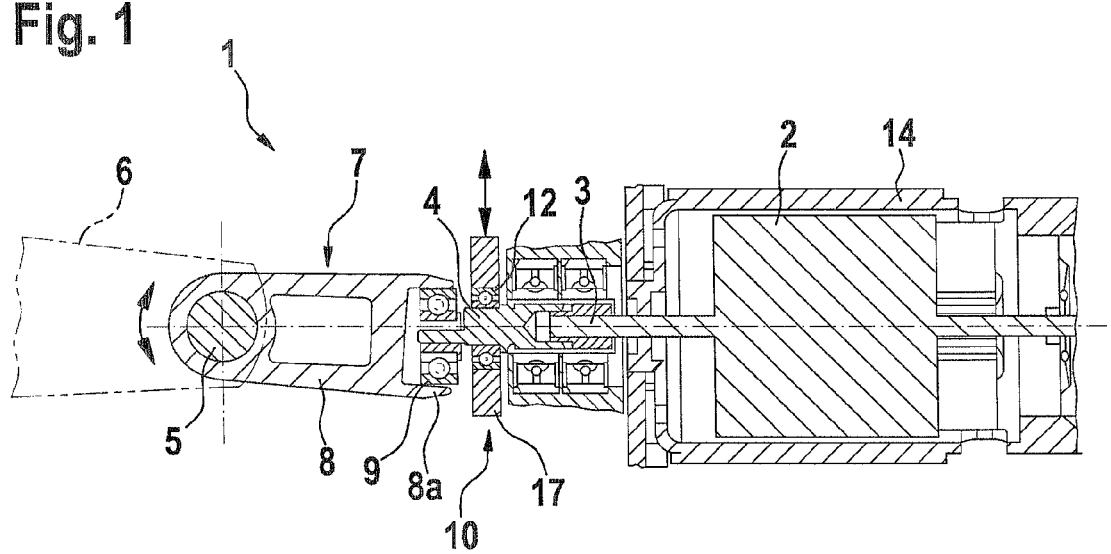
FIG. 1 is a top view of a hand-held power tool that has an output shaft for holding a tool and having a mass-compensation device to compensate for imbalance oscillations.

The hand-held power tool 1 depicted in FIG. 1 is provided with an electric drive motor 2 that has an armature 3 to which a coaxially arranged drive shaft 4 is affixed for co-rotation. The drive unit and the armature are supported within a housing 14. Via an eccentric coupling device 7, the drive shaft 4 drives an output shaft 5, which supports a replaceable tool 6. The rotation axes of the drive shaft 4 and output shaft 5 are oriented perpendicular to each other. When the electric drive motor 2 is actuated, the eccentric coupling device 7 converts the rotary motion of the drive shaft 4 into a rotary pendulum motion of the output shaft 5 and the tool 6. The angular deflection of the rotary pendulum motion of the output shaft 5 is usually a few degrees. The tool 6 can be used both for grinding and for cutting or sawing a work piece.

The eccentric coupling device 7 includes a coupling fork 8 whose end remote from the output shaft 5 has a crimped section 8*a* in contact with an eccentric cam 9 that is mounted to the drive shaft 4 for co-rotation. The coupling fork 8 slides along the eccentric contour of the eccentric cam 9 and is thus set into the rotary pendulum oscillation that is transmitted to the output shaft 5.

When the rotary motion of the drive shaft 4 is transmitted to the output shaft 5 with the aid of the eccentric coupling device 7, this produces a mass imbalance that is at least partially compensated for by means of a mass-compensation device 10. Like the eccentric coupling device 7, the mass-compensation device 10 is situated between the drive shaft 4 and the output shaft 5. In the mass-compensation device 10, oscillations are produced in opposition to the imbalance oscillations produced by the eccentric coupling device 7.

Figure 2:
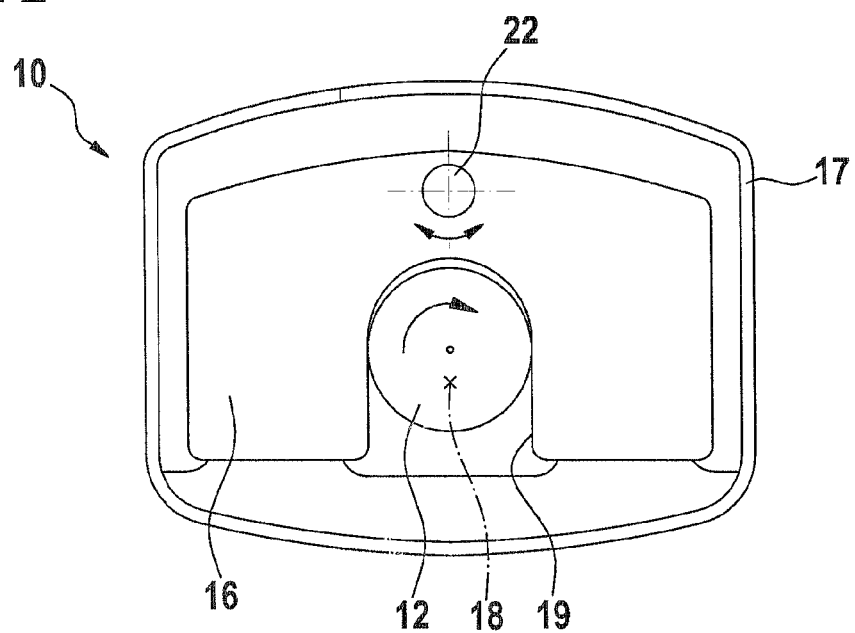
FIG. 2 shows a detail of the mass-compensation device, which embodied in the form of a stroke mass part that is rotatably supported in a slot guide and is driven by an eccentric cam.

As shown in FIG. 2, the mass-compensation device 10 is composed of a stroke mass part 16 that is held in moving fashion in a slot guide part 17 that is suitably affixed to the housing of the hand-held power tool. The slot guide part 17 is composed of a surrounding closed frame that encompasses an eccentric cam 12 that is affixed to the drive shaft 4 for co-rotation. The stroke mass part 16 is accommodated in moving fashion in the slot guide part 17 and is supported in rotary fashion in the slot guide part 17 by means of a rotary bearing 22 embodied in the form of a roller bearing. The stroke mass part 16 has a recess 19 into which the driving eccentric cam 12 protrudes. The eccentric cam 12 is supported in rotary fashion around the rotation axis 18 that extends spaced apart from the center point of the eccentric cam. The rotation axis 18 simultaneously constitutes the rotation axis of the drive shaft 4.

The eccentric cam 12 functions as a drive element for the stroke mass part 16. When the eccentric cam 12 rotates, its eccentric rotary motion is transmitted via the inner walls of the recess 19 to the stroke mass part 16, which, due to its rotary support by means of the rotary bearing 22, executes a rotary pendulum motion around the rotation axis of the rotary bearing 22 inside the slot guide part 17. This rotary pendulum motion of the stroke mass part 16 lies in a plane perpendicular to the rotation axis 18 and drive shaft 4. The deflections in this case are oriented in opposition to the deflections of the output shaft 5 and the tool 6 supported on it.

Both the rotary bearing 22 and the eccentric cam 12 are arranged symmetrically in the mass-compensation device 10. The rotary bearing 22 is situated in the middle of the slot guide part 17, as is the eccentric cam 12. The rotary pendulum motion of the stroke mass part 16 usually moves in an angular range of a few degrees, with the dimensions of the stroke mass part 16 and slot guide part 17 being adapted to each other so that the stroke mass part 16 always moves inside the contour of the slot guide part 17.

The foregoing relates to the preferred exemplary embodiment of the invention, it being understood that other variants and embodiments thereof are possible within the spirit and scope of the invention, the latter being defined by the appended claims.

The invention claimed is:

1. A motor-driven power tool, in particular a hand-held power tool, comprising:
   a tool;
   a motor including a drive shaft driven by the motor, wherein the drive shaft defines a drive shaft axis about which the drive shaft rotates;
   an output shaft on which the tool is accommodated;
   an eccentric coupling device configured to transmit the rotary motion of the drive shaft to the output shaft; and
   a mass-compensation device provided for oscillation compensation purposes, which is operatively connected to at least one of the drive shaft and the output shaft, and which executes a compensating motion in opposition to an eccentric coupling motion,
   wherein the mass-compensation device includes a stroke mass part that is movably supported in a slot guide with a rotary bearing defining a rotary bearing axis about which the rotary bearing rotates, the rotary bearing axis being displaced from the drive shaft axis, the slot guide including a surrounding closed frame that encompasses an eccentric cam affixed to the drive shaft for coaxial rotation therewith, with the stroke mass part executing a non-linear compensating motion inside the slot guide, the non-linear compensating motion of the stroke mass part being independent of motion of the slot guide and the eccentric cam acting as a drive element for the stroke mass part which has a recess into which the eccentric cam protrudes, and
   wherein the stroke mass part and the eccentric cam execute movements in a shared common plane which is perpendicular to axes of rotation of the output shaft and of the drive shaft axis, which are perpendicular to one another and wherein the rotary bearing axis remains at a fixed location with respect to the drive shaft axis during rotation of the drive shaft.

2. The power tool as recited in claim 1, wherein the compensating motion executed by the stroke mass part inside the slot guide occurs in the common plane perpendicular to the drive shaft.

3. The power tool as recited in claim 2, wherein the stroke mass part executes an exclusively rotary motion in the slot guide in opposition to the eccentric coupling motion.

4. The power tool as recited in claim 2, wherein the stroke mass part executes a combined rotary and translatory motion in the slot guide in opposition to the eccentric coupling motion.

5. The power tool as recited in claim 1, wherein the stroke mass part executes an exclusively rotary motion in the slot guide in opposition to the eccentric coupling motion.

6. The power tool as recited in claim 1, wherein the stroke mass part executes a combined rotary and translatory motion in the slot guide in opposition to the eccentric coupling motion.

7. The power tool as recited in claim 1, wherein the rotary bearing comprises a roller bearing.

8. The power tool as recited in claim 7, wherein the roller bearing of the stroke mass part is situated in the middle of the slot guide.

9. The power tool as recited in claim 1, wherein the eccentric cam is situated in the middle of the slot guide.

10. The power tool as recited in claim 1, wherein the drive shaft is supported in cantilevered, eccentric fashion in the housing.

11. The power tool as recited in claim 1, wherein the common plane extends laterally from the rotary bearing axis.

12. The power tool as recited in claim 1, wherein the drive shaft is directly connected to the cam and the stroke mass part is disconnected from the drive shaft.

13. The power tool as recited in claim 1, wherein the cam is directly driven by the drive shaft and the cam directly drives the stroke mass part about the rotary bearing axis.

14. The power tool as recited in claim 1, wherein the recess includes an inner wall and the eccentric cam protrudes into the recess and is in direct contact with the inner wall.

15. The power tool as recited in claim 14, wherein during rotation of the drive shaft the stroke mass part executes a rotary pendulum motion around the rotary bearing axis in response to direct contact of the eccentric cam with the inner wall.

16. A motor-driven power tool recited in particular a hand-held power tool, comprising:

a tool;

a motor including a drive shaft driven by the motor, wherein the drive shaft defines a drive shaft axis about which the drive shaft rotates;

an output shaft on which the tool is accommodated;

an eccentric cou lin device configured to transmit the rotar motion of the drive shaft to the output shaft; and a mass-compensation device provided for oscillation compensation purposes, which is operatively connected to at least one of the drive shaft and the output shaft, and which executes a compensating motion in opposition to an eccentric coupling motion, wherein the mass-compensation device includes a stroke mass part that is movably supported in a slot guide with a rotary bearing defining a rotary bearing axis about which the rotary bearing rotates, the rotary bearing axis being displaced from the drive shaft axis, the slot guide including a surrounding closed frame that encompasses an eccentric cam affixed to the drive shaft for coaxial rotation therewith, with the stroke mass part executing a non-linear compensating motion inside the slot guide, the non-linear compensating motion of the stroke mass part being independent of motion of the slot guide and the eccentric cam acting as a drive element for the stroke mass part which has a recess into which the eccentric cam protrudes, wherein the stroke mass part and the eccentric cam execute movements in a common plane which is perpendicular to axes of rotation of the output shaft and of the drive shaft axis, which are perpendicular to one another and wherein the rotary bearing axis remains at a fixed location during rotation of the drive shaft, wherein the surrounding closed frame encloses the stroke mass part along a lateral plane disposed in a direction extending laterally from the rotary bearing axis, and wherein the surrounding closed frame further comprises a raised edge, wherein the raised edge defines a closed perimeter surrounding the stroke mass part.

17. The power tool as recited in claim 16, wherein the stroke mass part is driven solely by movement of the eccentric cam and the stroke mass part freely rotates about the of the rotary bearing axis.

18. The power tool as recited in claim 16, wherein the recess includes an inner wall and the eccentric cam protrudes into the recess and is in direct contact with the inner wall.

19. The power tool as recited in claim 18, wherein during rotation of the drive shaft the stroke mass part executes a rotary pendulum motion around the rotary bearing axis in response to direct contact of the eccentric cam with the inner wall.

* * * * *

UNITED STATES PATENT AND TRADEMARK OFFICE
CERTIFICATE OF CORRECTION

| | | |
|---|---|---|
| PATENT NO. | : 8,720,162 B2 | Page 1 of 1 |
| APPLICATION NO. | : 12/863197 | |
| DATED | : May 13, 2014 | |
| INVENTOR(S) | : Adolf Zaiser | |

It is certified that error appears in the above-identified patent and that said Letters Patent is hereby corrected as shown below:

In the Claims

Column 5, lines 1-9, the first 9 lines of claim 16, should read as follows:

16. A motor-driven power tool in particular a hand-held power tool, comprising:
        a tool;
        a motor including a drive shaft driven by the motor,
            wherein the drive shaft defines a drive shaft axis about which the drive shaft rotates;
        an output shaft on which the tool is accommodated;
        an eccentric coupling device configured to transmit the rotary motion of the drive shaft to the output shaft; and Signed and Sealed this
Eleventh Day of November, 2014

Michelle K. Lee
*Deputy Director of the United States Patent and Trademark Office*